W. H. KELLY.
MOTION PICTURE PROJECTING MACHINE.
APPLICATION FILED AUG. 8, 1918.
1,341,467.
Patented May 25, 1920.
2 SHEETS—SHEET 1.
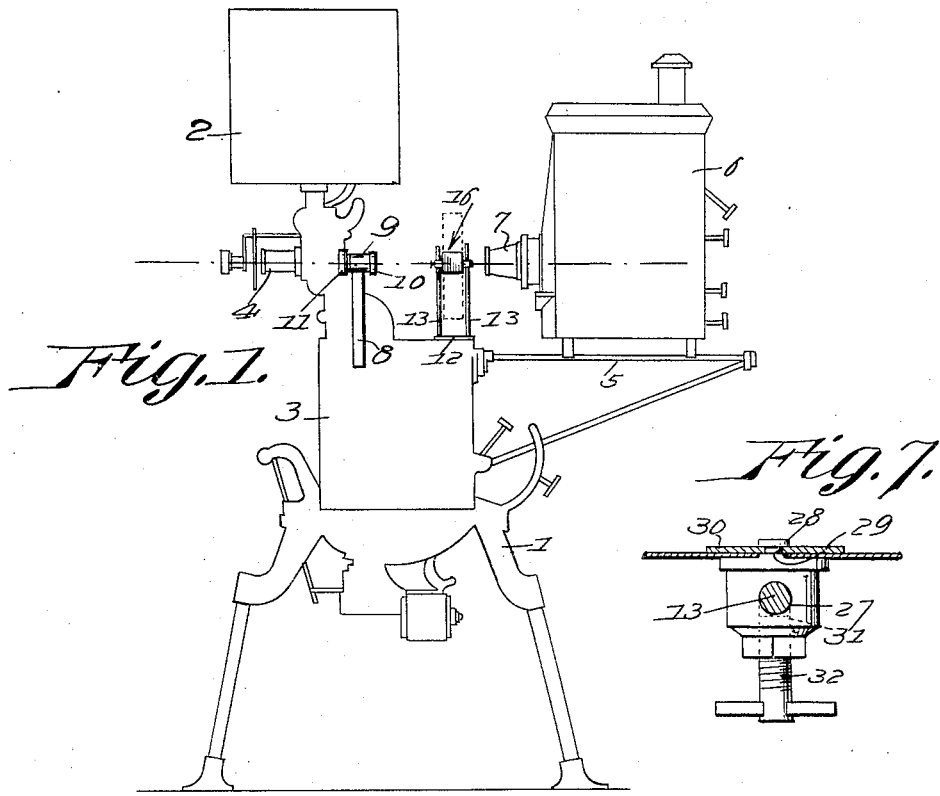
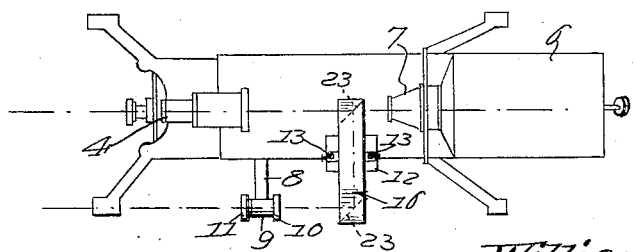
Inventor
William H. Kelly,
By
Attorney W. H. KELLY.
MOTION PICTURE PROJECTING MACHINE.
APPLICATION FILED AUG. 8, 1918.
1,341,467.
Patented May 25, 1920.
2 SHEETS—SHEET 2.
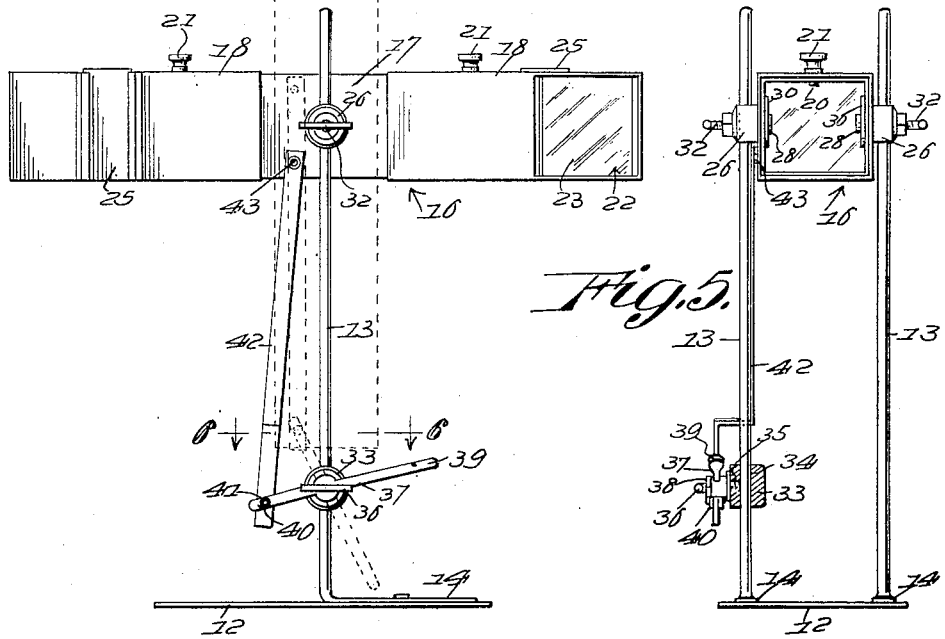
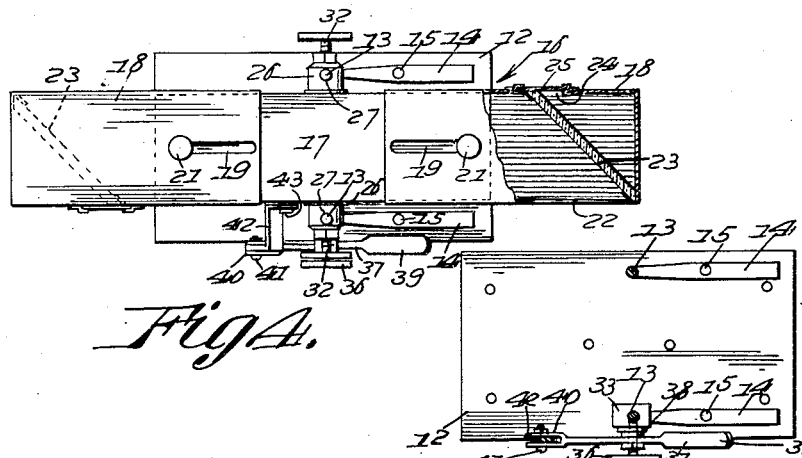
Inventor
William H. Kelly,
By
E. Hume Talbert, Attorney

UNITED STATES PATENT OFFICE.

WILLIAM H. KELLY, OF SPARKS, NEVADA.

MOTION-PICTURE-PROJECTING MACHINE.

1,341,467.  Specification of Letters Patent.  Patented May 25, 1920.

Application filed August 8, 1918. Serial No. 248,898.

*To all whom it may concern:*

Be it known that I, WILLIAM H. KELLY, a citizen of the United States, residing at Sparks, in the county of Washoe and State of Nevada, have invented new and useful Improvements in Motion-Picture-Projecting Machines, of which the following is a specification.

This invention comprehends generally improvements in motion picture projecting machines and more particularly relates to a light reflecting attachment for motion picture projecting machines.

It is the principal object of this invention to provide a device of the above mentioned character designed to be used in conjunction with an auxiliary lens and the light condensing tube of a motion picture machine for reflecting the light from the light condensing tube through the auxiliary lens to enable the operator of the machine to display advertising slides, et cetera, while the parts are capable of being adjusted into a vertical inactive position so as to allow the light from the light condensing tube being projected through the main objective lens for the displaying of motion pictures.

As an equally important object the present invention embraces the provision of a light reflecting tube designed in sections which are capable of being adjusted to various positions with respect to each other and maintained in such adjusted position.

As a further improvement this invention consists in the provision of novel means for adjustably supporting the light reflecting tube and its operating means in various positions of vertical adjustment to assure of an effective operation of the device in its entirety.

More particularly the present invention consists in the provision of novel common means for pivotally connecting the light reflecting tube on the supporting posts and for swingingly connecting the tube between the supporting surfaces so that the tube may be quickly and conveniently adjusted to various positions and may also be readily and easily swung into a vertical inactive position or a horizontal operative position, as desired.

It is a further object of this invention to provide an article of the above mentioned character which is simple in construction, thoroughly reliable and efficient in its purpose and inexpensive in manufacture.

Other objects will be in part obvious and in part hereinafter set forth.

The invention accordingly consists in the features of construction, the combination of elements and the arrangement of parts which will be exemplified in the construction hereinafter described and the scope of the application of which will be indicated in the appended claims.

The invention is clearly illustrated in the accompanying drawings, in which:—

Figure 1 is a side elevation showing the device in position on a motion picture projecting machine.

Fig. 2 is a top plan view thereof.

Fig. 3 is a side elevation of the invention when in an operative position, the dotted lines indicating the position assumed by the light reflecting tube when in an inactive position.

Fig. 4 is a top plan view thereof partly in section.

Fig. 5 is a transverse sectional detail of the tube and a support therefor.

Fig. 6 is a horizontal sectional detail taken on line 6—6 of Fig. 3.

Fig. 7 is a sectional detail view.

Similar characters of reference are employed in all of the above described views, to indicate corresponding parts.

Referring now, more particularly, to the accompanying drawings there is provided a motion picture apparatus consisting of a main stand 1 which supports the film receiving casings 2 and 3 between which is positioned the casing of the main objective lens 4 while connected to the casing 3 is the platform 5 for supporting the lamp-box 6. A light condensing tube 7 projects from the lamp-box and is designed to normally project the light rays through the main objective lens 4.

In order to display advertising slides in conjunction with the apparatus mentioned a bracket 8 extends upwardly and from one side of the casing 3 and supports a casing 9 which receives an auxiliary lens 10 and this casing is also formed near its outer end with a slide receiving slot 11.

With a view toward providing an improved means for reflecting the light from the light condensing tube and through the auxiliary lens improved light reflecting means is employed. In accomplishing this purpose a base plate 12 is connected to the upper surface of the casing 3 which acts as a table, while spaced vertical rods 13 have their feet 14 connected to the base by means of fasteners 15. Swingably mounted between the rods or standards 13 is the light reflecting tube indicated in its entirety by the numeral 16. This tube consists of a main intermediate section 17 and adjustable end sections 18 which are telescoped about the respective ends of the intermediate section being preferably formed with longitudinal slots 19 through each of which is positioned the shank 20 of a set screw 21 the inner end of which shank is anchored near the end of the intermediate section 17 while the head of the screw serves to frictionally engage the upper surface of the adjacent section 18 and maintain the said section in an adjusted position. Each of the sections 18 is formed with an opening 22 in the side and near the outer end thereof, the openings being positioned on opposite sides while mounted in the closed corners of the sections opposite the openings and positioned at an incline are mirrors 23 to which access is had through the provision of other openings 24 opposite the openings 22 which are removably closed by the slides 25. The tube 16 of course, may be swung into a horizontal operative position so that the mirrors will reflect the light from the light condensing tube through the auxiliary lens 10 or else may swing to a vertical inactive position so as not to interfere with the light rays being projected from the light condensing tube and through the main objective lens 4.

The improved common means for pivotally connecting the tube between the rods 13 and for slidably supporting the tube so that it may be arranged in various positions of vertical adjustment consists of a pair of opposed blocks each indicated by the numeral 26 and formed with a longitudinal bore 27 which is positioned to slide about the adjacent rod 13 while projecting from the adjacent faces of each block is a lug 28. These lugs 28 are arranged through opposed openings 29 in the sides of the intermediate section 17 and thus serve to swingably support the tube, the inner portions of the studs being provided with opposed notches in which are engaged bifurcated retaining washers 30. The blocks 26 are each formed on their outer side faces with transversely extending threaded openings 31 which communicate with the bores or openings 27 while adjustably engaged in the openings are set screws 32 for frictional engagement with the adjacent rod 13 to maintain the tube in various positions of vertical adjustment subsequent to the sliding of the blocks into the desired position as is apparent.

In order to swing the tube 16 another block 33 is formed with a vertical bore 34 for slidable disposition on one of the rods 13 and is also formed with a transversely extending threaded opening 35 which communicates with the outer face of the block and the bore 34 being designed to receive the shank of a set screw 36. A manually operable lever 37 is swingably mounted intermediate its ends on the shank of the set screw 36 being prevented from transverse movement by means of lock nuts 38 engaged on the shank of a set screw 36 and positioned on opposite sides of the lever. One end portion of the lever constitutes a handle 39 while the opposite end is bifurcated as at 40 and has pivotally arranged therebetween as at 41 one end of a connecting rod 42, the opposite end of which is pivotally connected by means of a fastener 43 to a portion of the tube section 17 as indicated in Fig. 3 and by this arrangement it is apparent that upon the depressing of the handle 39 the rod 42 will be moved upwardly to consequently swing the tube 18 into a vertical inactive position. Upon the swinging of the handle in the opposite direction the tube 16 will be swung into a horizontal operative position so that light rays from the condensing tube will be reflected through the tube 16 owing to the peculiar arrangement of the mirrors 23 and subsequently project through the auxiliary lens so as to display advertising slides, as is apparent.

It is believed in view of the foregoing description that a further detail description of the operation of the invention is entirely unnecessary. Likewise it is believed that the advantages of the invention will be readily apparent.

It will be understood that the above description and accompanying drawings comprehend only the general and preferred embodiment of this invention and that various minor changes in detail of construction, proportion and arrangement of the parts may be made within the scope of the appended claims and without sacrificing any of the advantages of this invention.

What is claimed is:

1. The combination with the lamp house, a main objective lens of a motion picture projecting machine, of an auxiliary lens, a light reflecting tube positioned between the lamp box and the auxiliary lens, common means for pivotally and slidably supporting the tube for vertical movement, and means for swinging the tube into a horizontal operative position or a vertical inactive position.

2. The combination with the lamp box, a main objective lens of a motion picture projecting machine, of an auxiliary lens connected to the machine and positioned to one side of the main lens, a pair of spaced supporting rods connected to the machine, a light reflecting tube, means for swingably supporting the tube between the rods and for slidably connecting the tube to the rods, means for holding the tube in various positions of vertical adjustment, and means for swinging the tube to a horizontal operative position to reflect light rays from the lamp house through the auxiliary lens and for swinging the tube into a vertical inactive position.

3. The combination with the lamp box, the light condensing tube and the main objective lens of a motion picture machine, of an auxiliary lens connected to the machine and positioned to one side thereof, a base plate connected to the machine, a pair of supporting rods arising therefrom and positioned between the light condensing tube and the main objective lens, a light reflecting tube embodying a main intermediate section, end sections telescopically mounted on the ends of the intermediate sections, means for holding the sections in various positions of adjustment the outer sections of the tube being formed at their opposed sides and near their outer ends with openings, mirrors positioned in the outer ends of the outer sections, means for slidably and pivotally connecting the intermediate section of the tube between the rods, and means for swinging the tube so that the light rays from the light condensing tube will be reflected through the light reflecting tube and projected through the auxiliary lens or else swung into a vertical inactive position to allow the light rays being projected from the condensing tube and through the main objective lens.

4. In a device of the character mentioned a light reflecting tube, a pair of spaced supporting rods, blocks slidably mounted on the rods and formed with studs for swingably supporting the tube, means mounted in the blocks for engagement with the rods so as to support the tube in various positions of vertical adjustment, and means for swinging the tube to either a horizontal or a vertical position.

5. In a device of the character described, a light reflecting tube, a pair of spaced supporting rods, means for slidably and swingably connecting the tube between the rods, an operating lever slidably and swingably connected to one of the rods and operatively connected to the tube for swinging the tube into a vertical position or a horizontal position.

6. In a device of the character described, a base plate, a pair of vertical supporting rods, a light reflecting tube, blocks slidably connected to the rods and formed with studs for swingably supporting the tube, means for retaining the studs against accidental displacement from the tube, means for maintaining the blocks in various positions of adjustment, a lever slidably and swingably connected to one of the rods, a connected rod operatively connected to one end of the lever to the tube whereby upon swinging the lever the tube will be swung into either a horizontal operative position or a vertical inactive position.

In testimony whereof I affix my signature.

WILLIAM H. KELLY.